United States Patent [19]

Howell et al.

[11] Patent Number: 5,322,887

[45] Date of Patent: Jun. 21, 1994

[54] POLYMERIC PARTICLES AND A METHOD OF PREPARING THE SAME

[75] Inventors: Bonnie L. Howell; Thomas H. Whitesides, both of Rochester, N.Y.

[73] Assignee: Eastman Kodak Company, Rochester, N.Y.

[21] Appl. No.: 884,788

[22] Filed: May 18, 1992

[51] Int. Cl.$^5$ .......................... C08J 3/02; C08K 3/08; C08K 3/10; C08K 3/16; C08L 25/00; C08L 27/00

[52] U.S. Cl. .................................. 524/781; 523/334; 524/430; 524/431

[58] Field of Search ................ 523/334; 524/781, 430, 524/431

[56] References Cited

U.S. PATENT DOCUMENTS

| 2,932,629 | 4/1960 | Wiley et al. | 260/91.5 |
| 4,148,741 | 4/1979 | Bayley | 252/62.1 P |
| 4,833,060 | 5/1989 | Nair et al. | 430/137 |
| 4,835,084 | 5/1989 | Nair et al. | 430/137 |
| 4,965,131 | 10/1990 | Nair et al. | 428/407 |

Primary Examiner—Paul R. Michl
Assistant Examiner—U. K. Rajguru
Attorney, Agent, or Firm—Robert A. Gerlach

[57] ABSTRACT

This invention provides polymeric particles uniformly coated with colloidal cupric oxide particles by forming a suspension of polymer particles as a discontinuous phase in a continuous aqueous phase containing a colloidal cupric oxide suspension stabilizer.

10 Claims, No Drawings

POLYMERIC PARTICLES AND A METHOD OF PREPARING THE SAME

BACKGROUND OF THE INVENTION

Field of the Invention

This invention relates to polymeric particles of narrow sized distribution and to a method of preparing the same. More particularly, the invention relates to polymeric particles suitable for use as electrostatographic toners, matte beads for forming matte surfaces on photographic elements and as polymeric pigment particles.

There are many applications for powdered polymeric particles where it is important that the particles have a narrow size distribution. One such application is where the particles are used as electrostatographic toners. In such toners the particles can function, for example, as the sole toner component to form toner images or as binders for other toner addenda such as colorants and charge control agents. The electrostatographic toners are in the form of particles that are subject to electrostatic forces and other forces that affect the particles differently depending on their size, and, in order to obtain good copies, it is necessary that all of the particles be affected in substantially the same way in the copying process. This means that the particles must have a narrow size distribution. While there are many processes that produce polymer particles, few produce such particles having a narrow size distribution. If the particles do not have a narrow size distribution, it may be necessary to size them by passing the particles through sieves. This is an expensive process which significantly adds to the cost of the electrostatographic toner.

A well-known process that provides polymer particles having a narrow size distribution employs a solid colloidal stabilizer to control both particle size and particle size distribution. One example of this type of process is described in U.S. Pat. Nos. 2,932,629 and 4,148,741, which pertain to a suspension polymerization process where a solid colloidal stabilizer such as silica is used to limit the coalescence of droplets containing polymerizable monomer in an aqueous medium. In that process, a water-immiscible polymerizable liquid is sheared to form small droplets suspended in aqueous medium containing a water dispersible water-insoluble solid colloid such as silica as the suspension stabilizer. The concentration and size of the colloid determines the size of the droplets. The colloid performs this function by adhering to the droplets at the water/monomer interface to form a layer on the surface of the droplets. After monomer droplets have coalesced with other droplets and have grown to a particular diameter, the presence of the layer of colloidal stabilizer particles on the surface of the droplets prevents them from further coalescing and increasing in diameter. In this way, all of the droplets tend to grow to approximately the same diameter, so that upon polymerization the resulting polymer particles have a narrow size distribution.

A second example of a process that provides polymer particles having a narrow size distribution using a solid colloidal stabilizer comprises forming a solution of polymer in a solvent that is immiscible with water, dispersing the polymer/solvent solution in an aqueous medium containing silica as the solid colloidal stabilizer, removing the solvent, dehydrating and drying the resulting particles. For ease in distinguishing this type of process from the aforementioned "suspension polymerization" process, it is referred to hereinafter as the "polymer suspension" process. This type of process is described in U.S. Pat. No. 4,833,060, issued May 23, 1989 assigned to the same assignee as this application and herein incorporated by reference.

The use of solid colloidal stabilizers such as silica to control particle size and size distribution of the resulting polymers has some disadvantages. For example, such solid colloidal particles can impart surface characteristics to the polymers that are incompatible with the intended use. Thus, if silica is used as the colloidal stabilizer in the preparation of polymer particles for use as electrostatographic toners it must be removed from the particles because silica adversely affects the triboelectric properties and the fixing characteristics of the toner. The removal of silica from the polymer particles requires several additional processing steps that significantly add to the cost of the toner. Furthermore, stabilizers such as silica are difficult to remove as is evident from U.S. Pat. No. 4,835,084, assigned to the same assignee as this application and incorporated herein by reference.

Another technique for preparing polymeric particles is that described in U.S. Pat. No. 4,965,131 issued Oct. 23, 1990 and assigned to the same assignee as the immediate application. This technique results in polymeric particles surrounded by smaller polymeric particles. These smaller particles serve as a colloidal suspension agent in processes similar to that described above. This process has the advantage in that the surface characteristics of toner particles, for example, can be designed into the particles by choice of the polymeric suspension agents. However, it is not the intent of this technique that toner particles be prepared by providing a colloidal suspension agent that is readily removed from the core particle.

SUMMARY OF THE INVENTION

This invention provides polymeric particles uniformly coated with colloidal cupric oxide particles by forming a suspension of polymer particles as a discontinuous phase in a continuous aqueous phase containing a colloidal cupric oxide suspension stabilizer. The invention contemplates the technique of limited coalescence "suspension polymerization" and also the "polymer suspension" process as previously defined above. Both techniques result in the polymeric particles being completely covered by the cupric oxide colloidal stabilizer particles. The techniques described are advantageous over that described in the prior art in that the copper oxide coated polymeric particles can be readily processed by simple techniques to remove the copper oxide from the surface thereof and thereby render the particles suitable as toner particles or as matte particles for inclusion in photographic elements.

DETAILED DESCRIPTION OF THE INVENTION

The method of this invention for the preparation of polymer particles encompasses the "suspension polymerization" technique wherein polymerizable monomer or monomers are added to an aqueous medium containing a particulate suspension of solid stabilizer of colloidal size. This mixture is agitated under shearing forces to reduce the size of the droplets. During this time an equilibrium is reached and the size of the droplets is stabilized by the action of the colloidal stabilizer in coating the surface of the droplets. Polymerization is completed to form an aqueous suspension of polymer particles in an aqueous phase having a layer of solid particulate colloid stabilizer on the surface of the polymer particles.

The method of this invention also encompasses the "polymer suspension" technique where solid stabilizers of colloidal size are used to limit the coalescence of suspended droplets formed from polymers dissolved in a solvent. Solutions of the polymers are dispersed as fine water-immiscible liquid droplets in water which contains the colloidal stabilizer. The suspension is stabilized by limiting the coalescence of the droplets as the solvent evaporates. Additional description of this type of process can be found in U.S. Pat. No. 4,833,060, issued May 23, 1989, previously referenced herein.

In practicing this invention using the "suspension polymerization" technique, suitable monomers include for example, styrene, p-chlorostyrene; vinyl naphthalene vinyl toluene; ethylenically unsaturated mono olefins such as ethylene, propylene, butylene and isobutylene; vinyl halides such as vinyl chloride, vinyl bromide, vinyl fluoride, vinyl acetate, vinyl propionate, vinyl benzoate and vinyl butyrate; esters of alphamethylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methylalphachloroacrylate, methyl methacrylate, ethyl methacrylate and butyl methacrylate; acrylonitrile, methacrylonitrile, acrylamide, vinyl ethers such as vinyl methyl ether, vinyl isobutyl ether and vinyl ethyl ether; vinyl ketones such as vinyl methylketone, vinyl hexyl ketone and methyl isopropyl ketone; vinylidene halides such as vinylidene chloride and vinylidene chlorofluoride; and N-vinyl compounds such as N-vinyl pyrrole, N-vinyl carbazole, N-vinyl indole and N-vinyl pyrrolidene; and mixtures thereof.

If desired, a chain transfer agent or crosslinking agent can be used in the "suspension polymerization" technique to modify the polymeric particles formed and produce particularly desired properties. Typical crosslinking agents are aromatic divinyl compounds such as divinylbenzene, divinylnaphthalene or derivatives thereof; diethylenecarboxylate esters such as diethylene methacrylate, diethylene acrylate; and other divinyl compounds such as divinyl sulfide or divinyl sulfone compounds.

In the "suspension polymerization" technique a catalyst or initiator which is compatible with the particular monomer or monomers used may be utilized. Typical initiators for polymerization are the peroxide and azo initiators. Among those found suitable for use in the process of this invention are 2,2'-azobis(2,4-dimethyl valeronitrile), lauroyl peroxide and the like which result in complete polymerization without leaving detrimental residual materials or requiring very high temperatures or pressures. Chain transfer and crosslinking agents can be added to the monomer to aid polymerization and control the properties of the particle formed.

Polymers or mixture of polymers that can be used as starting materials using the "polymer suspension" technique in accordance with this invention, include for example, olefin homopolymers and copolymers, such as polyethylene, polypropylene, polyisobutylene, and polyisopentylene; polyfluoroolefins such as polytetrafluoroethylene; polyhexamethylene adipamide, polyhexamethylene sebacamide and polycaprolactam; acrylic resins, such as polymethylmethacrylate, polyacrylonitrile, polymethylacrylate, polyethylmethacrylate and styrene-methylmethacrylate or ethylene-methyl acrylate copolymers, ethylene-ethyl acrylate copolymers, ethylene-ethyl methacrylate copolymers, polystyrene and copolymers of styrene with unsaturated monomers mentioned above, cellulose derivatives, such as cellulose acetate, cellulose acetate butyrate, cellulose propionate, cellulose acetate propionate, and ethyl cellulose; polyesters such as polyethylene terephthalate, polybutylene adipate, polycarbonates and the like; polyvinyl resins such as polyvinyl chloride, copolymers of vinyl chloride and vinyl acetate and polyvinyl butyral, polyvinyl alcohol, polyvinyl acetal, ethylene-vinyl acetate copolymers ethylene-vinyl alcohol copolymers, and ethylene-allyl copolymers such as ethylene-allyl alcohol copolymers, ethylene-allyl acetone copolymers, ethylene-allyl benzene copolymers ethylene-allyl ether copolymers, ethylene-acrylic copolymers and polyoxy-methylene, polycondensation polymers, such as, polyesters, polyurethanes, polyamides and polycarbonates.

Useful solvents for the "polymer suspension" process are those that dissolve the polymer and which are also immiscible with water including, for example, chloromethane, dichloromethane, ethyl acetate, vinyl chloride, methyl ethyl ketone, trichloromethane, carbon tetrachloride, ethylene chloride, trichloroethane, toluene, xylene, cyclohexanone, 2-nitropropane and the like. A particularly useful solvent is dichloromethane because it is both a good solvent for many polymers while at the same time it is immiscible with water. Further, its volatility is such that it can be readily removed from the discontinuous phase droplets by evaporation.

In the "polymer suspension" process of this invention, the quantities of the various ingredients and their relationship to each other can vary over wide ranges, however, it has generally been found that the ratio of the polymer to the solvent should vary in an amount of from about 1 to about 80 percent, by weight, of combined weight of polymer and solvent and that the combined weight of the polymer in the solvent should vary with respect to the quantity of water employed in an amount of from about 25 to about 50 percent, by weight. Also, the size and quantity of the cupric oxide colloidal stabilizer depends upon the size of the particles of the stabilizer and also upon the size of the polymer particles desired. Thus, as the size of the polymer/solvent droplets are made smaller by high shear agitation, the quantity of solid colloidal stabilizer is varied to prevent uncontrolled coalescence of the droplets and in order to achieve uniform size and narrow size distribution in the polymer particles that result.

Polymer particles having average diameters in the range of about $0.1\mu$ to about $150\mu$, often from about $2\mu$ to about $30\mu$ can be prepared in accordance with the process of this invention. Such particles have a very narrow size distribution. Their coefficients of variation (ratio of the standard deviation to the average diameter) as described in U.S. Pat. No. 2,932,629, referenced previously herein, are normally in the range of about 15 to 35%.

As previously indicated herein, electrostatographic toners can be made using the process of this invention. Such toners and their use are well known but a description of the electrostatic imaging process and the others used in that process at this point may be useful in understanding this feature of the invention.

In electrostatography an image comprising an electrostatic field pattern, usually of non-uniform strength, (also referred to as an electrostatic latent image) is formed on an insulative surface of an electrostatographic element by any of various methods. For example, the electrostatic latent image may be formed electrophotographically (i.e., by imagewise photo-induced dissipation of the strength of portions formed on a surface of an electrophotographic element comprising a photoconductive layer and electrically conductive substrate), or it may be formed by dielectric recording (i.e., by direct electrical formation of an electrostatic field pattern on a surface of a dielectric material). Typically, the electrostatic latent image is then developed into a toner image by contacting the latent image with an electrostatographic toner that is in powder form. If desired, the latent image can be transferred to another surface before development.

One well-known type of electrostatographic developer comprises a dry mixture of toner particles and carrier particles. Developers of this type are commonly employed in well-known electrostatographic development processes such as cascade development and magnetic brush development. The particles in such developers are formulated such that the toner particles and carrier particles occupy different positions in the triboelectric continuum, so that when they contact each other during mixing to form the developer, they become triboelectrically charged, with the toner particles acquiring a charge of the opposite polarity. These opposite charges attract each other such that the toner particles cling to the surfaces of the carrier particles. When the developer is brought into contact with the latent electrostatic image, the electrostatic forces of the latent image (sometimes in combination with an additional applied field) attract the toner particles, and the toner particles are pulled away from the carrier particles and become electrostatically attached imagewise to the latent image-bearing surface. The resultant toner image can then be fixed in place on the surface by application of heat or other known methods (depending upon the nature of the surface and of the toner image) or can be transferred to another surface, to which it then can be similarly fixed.

The toner particles can comprise any fixable polymer which has the physical properties required for a dry electrostatographic toner. By fixable is meant simply that the toner particles can be fixed or adhered to a receiving sheet such as paper or plastic. Useful toners are often thermally fixable to the receiving sheet. However, toners which are otherwise fixable, such as solvent-fixable, pressure-fixable or self-fixable, can be prepared in accordance with the invention. These fixing techniques and toners suitable for them are well-known in the art.

Many polymers have been reported in literature as being useful in dry electrostatographic toners. Depending upon the specific toner polymer desired, one can select the most appropriate technique, i.e., "suspension polymerization" or "polymer suspension", to be used in accordance with this invention. For example, polymers formed by addition polymerization are well suited to "suspension polymerization" while those formed by condensation polymerization are well suited to the "polymer suspension" technique. Polymers useful in toners include vinyl polymers, such as homopolymers and copolymers of styrene and condensation polymers such as polyesters and copolyesters. Especially useful toners are styrene polymers of from 40 to 100 percent by weight of styrene or styrene homologs and from 0 to 45 percent, by weight, of one or more lower alkyl acrylates or methacrylates. Fusible styrene-acrylic copolymers which are covalently lightly crosslinked with a divinyl compound such as divinylbenzene, as disclosed in the patent to Jadwin et al, U.S. Pat. No. Re. 31,072, are useful. Also especially useful are polyesters of aromatic dicarboxylic acids with one or more aliphatic diols, such as polyesters of isophthalic or terephthalic acid with diols such as ethylene glycol, cyclohexane dimethanol and bisphenols. Examples are disclosed in the patent to Jadwin et al.

Fusible toner particles prepared according to this invention can have fusing temperatures in the range from about 50° C. to 200° C. so they can readily be fused to paper receiving sheets. Preferred toners fuse in the range of from about 65° C. to 120° C. If the toner transfer is made to receiving sheets which can withstand higher temperatures, polymers of higher fusing temperatures can be used.

Toner particles prepared in accordance with this invention can simply comprise the polymeric particles but, it is often desirable to incorporate addenda in the toner such as waxes, colorants, release agents, charge control agents, and other toner addenda well known in the art. Where feasible, such addenda are added to the polymerizable monomer or polymer prior to their being suspended in aqueous medium.

If a colorless image is desired, it is not necessary to add colorants to the toner particles. However, more usually a visibly colored image is desired and suitable colorants selected from a wide variety of dyes and pigments such as disclosed for example, in U.S. Pat. No. Re. 31,072 are used. A particularly useful colorant for toners to be used in black-and-white electrophotographic copying machines is carbon black. Colorants in the amount of from about 1 to about 30 percent, by weight, based on the weight of the toner can be used. Often from about 1 to 8 percent, by weight, of colorant is employed.

Charge control agents suitable for use in toners are disclosed for example in U.S. Pat. Nos. 3,893,935; 4,079,014; 4,323,634 and British Patent Nos. 1,501,065 and 1,420,839. Charge control agents are generally employed in small quantities such as, from about 0.1 to about 3, weight percent, and preferably from about 0.2 to about 1.5 weight percent, based on the weight of the toner.

Toners prepared in accordance with this invention can be mixed with a carrier vehicle. The carrier vehicles, which can be used to form suitable developer compositions, can be selected from a variety of materials. Such materials include carrier core particles and core particles overcoated with a thin layer of film-forming resin.

The carrier core materials can comprise conductive, non-conductive, magnetic, or non-magnetic materials. See, for example, U.S. Pat. Nos. 3,850,663 and 3,970,571. Especially useful in magnetic brush development schemes are iron particles such as porous iron particles having oxidized surfaces, steel particles, and other "hard" or "soft" ferromagnetic materials such as gamma ferric oxides or ferrites, such as ferrites of barium, strontium, lead, magnesium, or aluminum. See for example, U.S. Pat. Nos. 4,042,518; 4,478,925; and 4,546,060.

As noted above, the carrier particles can be overcoated with a thin layer of a film-forming resin for the purpose of establishing the correct triboelectric relationship and charge level with the toner employed. Examples of suitable resins are described in U.S. Pat. Nos. 3,547,822; 3,632,512; 3,795,618; 3,898,170; 4,545,060; 4,478,925; 4,076,857; and 3,970,571.

A typical developer and composition containing the above-described toner and a carrier vehicle generally comprises from about 1 to about 20 percent, by weight, of particulate toner particles and from about 80 to about 99 weight, by weight, carrier particles. Usually, the carrier particles are larger than the toner particles. Conventional carrier particles have a particle size on the order of from about 20 to about 1200 micrometers, generally about 30–300 micrometers.

Alternatively, the toners of the present invention can be used in a single component developer, i.e., with no carrier particles.

Toner particles prepared in accordance with this invention should generally have an average diameter in the range of from about $0.1\mu$ to $100\mu$, a value of about $2\mu$ to about $20\mu$ being particularly useful in many current copy machines.

The following preparation techniques and examples further illustrate this invention.

The "average diameters" of the particles referred to in the following examples and elsewhere herein are diameters of median particles by volume, i.e., 50 percent of the total volume of the particles is made up of particles that each have a diameter greater than the reported value and 50 percent of the total volume of the particles is made up of particles that each have a diameter less than the reported value. The ranges for the diameters of the particles in the total volume are reported in the following examples and clearly illustrate the narrow distribution of polymer particles prepared according to this invention.

The formation and precipitation of CuO and Cu(OH)$_2$ has been studied by McFayden and Matjijevic, *J. Inorg. Nucl. Chem.* 35(1973) 1883–1893. At room temperature, addition of hydroxide ion to a solution of Cu(+2) such as copper nitrate, copper sulfate leads to the formation of a precipitate of blue-green, gelatinous hydrous cupric hydroxide. At higher temperature this material dehydrates to dark brown cupric oxide. The employment of a suitable base, including tertiary amines, hydroxides and the like under which the cupric oxide is precipitated in the form of very small particles is preferred. Tertiary amines including trialkyl amines such as triethylamine. tripropyl amine, diethylhexyl amine, triethylene diamine are more preferred. Triethyl amine is most preferred. Elevated temperatures of about 80° C. are employed. The oxide forms directly under these conditions, in the form of flocs of small crystals (which sediment rapidly, thus aiding concentration and purification of the colloid). Dialysis or diafiltration to remove flocculating salts, followed by sonication leads to a clear, brown suspension of particles which does not deposit appreciable sediment after standing for at least a few weeks.

In both the "suspension polymerization" and polymer suspension processes described herein in accordance with this invention utilizing cupric oxide as the suspension stabilizer, it is preferred to use a promoter that absorbs to the colloid and adjusts the three phase oil-particle-water contact angle to a value between zero and 180°. Suitable promoters include those set forth in U.S. Pat. No. 2,932,629 incorporated herein by reference. Organic sulfonates, sulfates and carboxylates having 1 to 10 carbon atoms are preferred. Sodium butane sulfonate and salts of propionic acid are more preferred in this process. The activity of the promoter is enhanced by the presence of di-valent salts; this preference is shown in the narrowness of the particle size distribution. The combination of sodium butane sulfonate with calcium acetate in the aqueous suspension together with the colloidal cupric oxide particles is preferred.

If desired, the cupric oxide can be readily removed from the surface of the polymeric particles by dilute acid treatment at room temperature, the particles being isolated by filtration. While any suitable acid may be employed, hydrochloric acid is preferred. An advantage of utilizing cupric oxide as the suspension stabilizer is that in the preparation of toner particles in particular, it permits the employment of certain surface active pigments. Thus, in the preparation of a magenta-colored toner, pigments such as media-milled Hostaperm Pink may be employed in the absence of further addenda, whereas such toners are impossible using colloidal silica suspension stabilizers in accordance with the prior art techniques enumerated above.

EXAMPLE 1

Preparation of Cupric Oxide Colloid

A 5 L three-necked round bottom flask was equipped with heating mantle, condenser, and mechanical stirrer. A heterogeneous mixture of 82 ml (60 g, 0.59 mol) triethylamine (TEA) and 4 L water was placed in the flask and heated to gentle reflux with stirring. A solution of 46.52 g (0.2 mol) Cu(NO$_3$)$_2$ 2.5 H$_2$O was added rapidly to the boiling mixture. A brown suspension of CuO formed immediately. The suspension was heated under reflux for 1 hour. The flask was then immersed in an ice/water mixture, and allowed to stand for several hours undisturbed at room temperature. As much of the clear supernatant phase as possible was separated from the precipitated CuO. The remaining concentrated suspension was transferred to a dialysis bag (Spectra-Por 2, MWCO 12,000–14,000), and dialyzed against distilled water for about 2 days (until the conductance of the suspension was reduced below about 10 $\mu$S). The deionized suspension was removed from the bag, and subjected to a total of 1.5 hours of sonication in 10 minute intervals until a clear brown sol was obtained. The concentration of CuO was determined by evaporation of an aliquot of the sol in a vacuum oven at 70° C.

The isolation and concentration of the CuO sol can be accomplished more efficiently by diafiltration utilizing an Amicon RA2000 CH2 Concentrator, HIP100-43 hollow fiber cartridge, operating at 20 psig backpressure, washing the concentrated sol several times with distilled water.

EXAMPLE 2

Preparation of Toner Particles Using CuO

An aqueous phase was prepared using 563.7 g of CuO suspension (2.96% solids, 16.69 g CuO), 26 ml 1M Ca(OAc)$_2$, 18.7 mL 1M Sodium butane sulfonate (BSS) and 691.6 g water. This mixture was added to an oil phase consisting of 353.7 g of a suspension of 10.4% Hostaperm Pink in a solution of 5.2% Piccotoner 1221 in ethyl acetate, 66.53 g additional Piccotoner 1221, 0.68 g tetradecylpyridinium tetraphenyl borate (TPTB charge control agent) and 100.4 g ethyl acetate. The total weight of Piccotoner 1221 was 103.0 g and of pigment was 18.3 g. A premix was prepared from this mixture using a high shear mixer (Silverson L4R, operating at maximum speed) for 1 min, and the resulting suspension passed through a Microfluidics Model M110F homogenizer at a pressure of about 8500 psig. Piccotoner 1221 is a polymer of styrene-co-butylacrylate (80/20) supplied by Hercules Corp.

The homogenized mixture was transferred to a 3 L three-necked round bottom flask and stirred mechanically at low speed under a continuous stream of dry nitrogen for about 24 hours, and then the last traces of ethyl acetate removed by evacuation of the flask using a water aspirator, and maintaining gentle stirring for an additional 24 hours.

After evaporation, the suspension of CuO-coated particles was poured through a fine mesh screen (50 μm hole size) to remove coagulum, and then treated with 23 ml of concentrated (12N) hydrochloric acid. The final particles were collected on Whatman No. 2 filter paper using suction filtration, and washed with 16 L of distilled water in 1 L portions. After air drying, 109 g of magenta colored toner particles were obtained (89%). The particles were sized on Coulter Multisizer II (70 μm orifice), and showed a number average diameter of 3.10 μm, a volume average diameter of 3.57 μm, a fineness index of 1.22, and a coarseness index of 1.18. Tribocharging of these particles were carried out using a magnetic brush system using ferrite particles coated with 1 pph Kyner (polyvinylidene fluoride) as carrier. The charge to mass ratio was 149 μC/g initially and 133 μC/g after 5 min exercise (RH=15%).

The fineness index and coarseness index are defined as follows. The PSD can be described in terms of a percentile-size function; this is the diameter at which the cumulative distribution has accounted for a given percentage of the total number or volume of the particles. The fineness index is defined as the ratio of the number-weighted mean diameter to the number-weighted 17th percentile-size. The coarseness index is defined as the ratio of the volume-weighted 83rd percentile size to the volume-weighted mean diameter. Both parameters must be greater than 1; the closer they are to 1, the narrower the PSD.

EXAMPLE 3

Effect of Butane Sulfonate on CuO-Stabilized Polymer Suspension

A variety of materials were screened for their effect on the CuO-stabilized "polymer suspension" technique. An oil phase consisting of a 20% solution of Piccotoner 1221 in ethyl acetate containing 0.05% TPTB was added to an aqueous phase containing 6.23 g of a CuO sol (3.26% solids) prepared by precipitation at high temperature using TEA as base diluted to 30 ml with water. A number of samples were prepared containing in addition other addenda intended to improve the limited coalescence process:

| Sample | Addendum | |
|---|---|---|
| A | 0.100 g | Dodecyltrimethyl ammonium chloride |
| B | 0.100 g | 10% poly(vinylpyrrolidone) (PVP) in water |
| C | 1.0 g | 0.72 M tripropylammonium acetate in water |
| D | 1.0 g | 0.72 M triethylammonium propionate in water |

| Sample | Addendum | |
|---|---|---|
| E | 0.104 g | sodium butanesulfonate |
| F | 0.70 g | 12.98% AMEA (a condensation copolymer of methylethanolamine and adipic acid) |
| G | — | (no addenda) |

The addenda of samples C and D were prepared by neutralizing an aqueous suspension of the appropriate tertiary amine with the appropriate carboxylic acid.

The mixtures were homogenized using a Gaulin Mill. The ethyl acetate was allowed to evaporate in the hood using slow magnetic stirring and the resulting particles in suspension treated with a few drops of concentrated HCl to dissolve the CuO. The particles were then collected by means of suction filtration, washed with water, and air dried. A sample was resuspended in water using a few drops of Alkanol XC (DuPont Co.) as a dispersing aid, and that portion of the material passing through a 50 μm screen was sized on the Coulter Multisizer II. Each sample was also examined using a microscope.

| Sample | Modal Diameter | Coarseness Index (CI) | Fineness (FI) | Remarks |
|---|---|---|---|---|
| A | 1.15 μm | 1.43 | >1.91 | very broad distribution |
| B | 3.43 | 1.40 | >1.59 | like control |
| C | 1.15 | 1.49 | >1.90 | very broad distribution |
| D | 4.11 | 1.45 | 1.35 | fairly narrow distribution |
| E | 4.58 | 1.37 | 1.34 | fairly narrow distribution |
| F | 3.20 | 1.42 | >1.51 | like control |
| G | 3.20 | 1.55 | >1.57 | control |

From these data we conclude that PVP and AMEA give results indistinguishable from the control sample, that dodecyltrimethylammonium and tripropylammonium ions interfere with the limited coalescence process, and act like surfactant stabilizers, while triethylammonium propionate and sodium butane sulfonate give substantially improved limited coalescence, as indicated by the narrower particle size distribution obtained.

EXAMPLE 4a (INVENTION), 4b AND 4c (COMPARISONS)

A common oil phase was prepared by mixing 100 g of a solution of 40 g Piccotoner 1221 and 0.50 g TPTB in 160 g of ethyl acetate with 100 g of a media-milled suspension of Hostaperm Pink in Piccotoner 1221 and ethyl acetate. Three separate toner preparations were carried out, using 60 g quantities of this oil phase in each one. In one, Example 4a, 70 g CuO colloid prepared in the presence of sodium butane sulfonate (together with 230 g water was used as stabilizer; a second Example 4b, used a mixture of 3.84 g Ludox TM, (colloidal silica sold by DuPont) 0.70 g 12.98% AMEA, and 295 g VWR pH 4 buffer; and a third, Example 4c, used 5.0 g 7.19% latex of stabilizer prepared according to "Preparation I" of U.S. Pat. No. 4,965,131 in 295 g pH 10 buffer from VWR Scientific Inc. All three were homogenized using 4 passes through a colloid mill, and the ethyl acetate evaporated under a stream of dry nitrogen while stirring with a mechanically driven paddle stirrer. The following results were obtained:

| Stabilizer | Yield[a] | Number Weighted ($D_n$) | Volume Weighted ($D_v$) | FI | CI |
|---|---|---|---|---|---|
| CuO | 10.60 g | 2.77 μm | 4.23 μm | 1.59 | 1.28 |
| Ludox TM | ND[b] | 1.94 | 3.44 | >1.55 | 1.48 |
| Latex Stabilizer | 3.50 g | 2.84 | 4.19 | 1.33 | 1.54 |

[a]The yield of dry particles passing through a 50 m screen.
[b]ND = Not Determined. See text.

It can be seen that only the CuO stabilizer gave an acceptable yield of small particles with a distribution indicating successful limited coalescence. In the case of the latex stabilizer, the yield was very low, most of the material appearing as a coagulum under the isolation conditions. In the case of the Ludox TM, the particle size distribution indicated complete failure of the limited coalescence process, and because of the wide particle size distribution, the filter clogged and no particles could be isolated under the standard isolation conditions.

EXAMPLE 5

Effect of Ca(+2) on CuO-Stabilized "Polymer Suspension" Toners

An oil phase was prepared by mixing 16.0 g Piccotoner 1221, 4.0 g of a roll-milled pigment concentrate, containing 50% Novoperm yellow pigment and 50% Pliotoner 4003, a vinyl toluene/acrylate ester copolymer supplied by Goodyear Corp., 0.048 g TPTB, and 80 g ethyl acetate. A series of aqueous phases were prepared, each with a total volume of 30 ml, containing 4.01 g of a 3.14% CuO colloid prepared using triethylamine, 1.25 g 0.72M sodium butanesulfonate, and from 0 to 50 mM calcium acetate. Each aqueous phase was mixed with 6.05 g of the oil phase, and the resulting heterogeneous mixture passed 4 times through a Gaulin Mill. The ethyl acetate was allowed to evaporate in the hood, using magnetic stirring. The CuO was dissolved by the addition of 1 ml concentrated HCL, and the resulting particles isolated by filtration and washing with water. The particle size distributions were measured using a Coulter Multisizer II, with the following results.

| Sample | Ca (mM) | $D_n$ (μm) | $D_v$ (μm) | FI | CI |
|---|---|---|---|---|---|
| A | 0.0 | 3.29 | 11.31 | >1.95 | 1.49 |
| B | 5.0 | 5.71 | 9.31 | 1.65 | 1.36 |
| C | 10.0 | 5.50 | 8.50 | 1.40 | 1.42 |
| D | 50.0 | 4.44 | 6.15 | 1.33 | 1.35 |

As the concentration of calcium ion in the aqueous phase increases, the particle size distribution of the resulting particles becomes much narrower as shown by the decreasing values of the coarseness and fineness indices, and the closer correspondence of the number- and volume-weighted average sizes.

A second experiment similar to that described above was carried out using calcium acetate concentrations ranging from 25 mM to 100 mM.

| Sample | Ca (mM) | 3.14% CuO | $D_n$ (μm) | $D_v$ (μm) | FI | CI |
|---|---|---|---|---|---|---|
| E | 50.0 | 4.41 | 4.17 | 6.39 | 1.45 | 1.42 |
| F | 75.0 | 4.41 | 4.11 | 4.34 | 1.47 | 1.43 |
| G | 100.0 | 4.41 | 4.05 | 6.09 | 1.48 | 1.38 |
| H | 25.0 | 5.46 | 3.81 | 5.67 | 1.39 | 1.41 |
| I | 50.0 | 5.46 | 3.69 | 5.28 | 1.41 | 1.37 |

These results indicate that the narrow particle size distributions can be obtained at both higher CuO concentrations (smaller particles) and with somewhat higher calcium concentrations.

EXAMPLE 6

Preparation of CuO Using KOH as Base

Cupric acetate hydrate (46.6 g, 0.2 mol) dissolved in 400 ml water was added all at once to a refluxing solution of 56 g (0.44 mol) KOH in 3.5 l of water in a 5 l three-necked round bottom flask equipped with a condenser and mechanical stirrer. The dark brown suspension was heated under reflux for an additional hour, and then cooled to room temperature. After standing undisturbed for 16 hours, the clear supernatant solution was removed by suction decantation. The residual CuO suspension was placed in a dialysis bag and dialyzed against running distilled water. When the conductivity of the suspension had been reduced from 10.5 mS to 0.6 mS, the suspension was removed from the dialysis bag and subjected to sonication for 30 min. The resulting suspension settled rapidly on standing. It had a solids content of 4.30%.

EXAMPLE 7

Use of CuO From KOH in "Polymer Suspension" Process

A series of small scale runs were made using the CuO preparation described above. A common oil phase was prepared by dissolving 75.0 g Piccotoner 1221 and 0.12 g TPTB in 175 g of ethyl acetate. Nine samples were prepared using this oil phase, with formulations as follows:

| Sample | 4.30% CuO | Ca(OAc)2 | 1.0 M BSS | 1.0 M | Water | Oil Phase |
|---|---|---|---|---|---|---|
| 1 | 15.0 g | | 1.50 g | 0.50 g | 58.0 g | 25.0 g |
| 2 | 15.0 | | 1.50 | 1.00 | 57.5 | 25.0 |
| 3 | 15.0 | | 1.50 | 2.00 | 56.5 | 25.0 |
| 4 | 30.0 | | 1.50 | 0.50 | 43.0 | 25.0 |
| 5 | 30.0 | | 1.50 | 1.00 | 42.5 | 25.0 |
| 6 | 30.0 | | 1.50 | 2.00 | 41.5 | 25.0 |
| 7 | 45.0 | | 1.50 | 0.50 | 28.0 | 25.0 |
| 8 | 45.0 | | 1.50 | 1.00 | 27.5 | 25.0 |
| 9 | 45.0 | | 1.50 | 2.00 | 26.5 | 25.0 |

These materials were mixed, homogenized and evaporated as described for the preparations using CuO prepared from triethylamine. After the CuO was removed using a few ml of concentrated HCl, the PSDs were determined using the Multisizer II with the results shown below.

| Sample | $D_n$ | $D_v$ | FI | CI |
|---|---|---|---|---|
| 1 | 3.94 μm | 6.17 μm | 1.68 | 1.30 |
| 2 | 4.26 | 6.23 | 1.63 | 1.28 |
| 3 | 4.28 | 6.21 | 1.59 | 1.27 |
| 4 | 4.17 | 7.01 | 1.80 | 1.37 |

-continued

| Sample | $D_n$ | $D_v$ | FI | CI |
|---|---|---|---|---|
| 5 | 4.11 | 6.90 | 1.77 | 1.36 |
| 6 | 3.97 | 6.38 | 1.74 | 1.34 |
| 7 | 4.06 | 6.42 | 1.75 | 1.32 |
| 8 | 4.08 | 6.64 | 1.81 | 1.34 |
| 9 | 4.22 | 7.25 | 1.84 | 1.38 |

The sizes and PSDs of these preparations are similar and broad, with a large number of fine particles. While Example 7 illustrates that the use of CuO prepared using KOH as base is less effective for the preparation polymeric particles than the CuO prepared from triethylamine, it establishes that the prepared CuO particles are suitable in accordance with this invention.

The invention has been described in detail with particular reference to preferred embodiments, however, it should be understood that variations and modifications can be effected within the spirit and scope of the invention.

What is claimed is:

1. In the method of making polymeric particles by a process which comprises the formation of a suspension of polymeric particles in an aqueous phase containing a particulate suspension stabilizer, the improvement which comprises employing colloidal cupric oxide as the particulate suspension stabilizer.

2. The method claim 1 wherein the cupric oxide particulate suspension stabilizer is formed by the addition of hydroxide ion to a Cu (+2) compound in the presence of a base.

3. The method of claim 2 wherein the base is a tertiary amine or an hydroxide.

4. The method of claim 3 wherein the tertiary amine is triethyl amine.

5. The process of claim 1 wherein a promoter is added to the aqueous phase.

6. The process of claim 5 wherein the promoter is an organic sulfonate, sulfate or carboxylate having 1 to 10 carbon atoms.

7. The process of claim 5 wherein the promoter is sodium butane sulfonate.

8. The process of claim 7 wherein calcium acetate is added to the aqueous phase.

9. The method of claim 1 wherein the polymer particles are formed by suspension polymerization.

10. The method of claim 1 wherein the polymer particles are formed by polymer suspension.

* * * * *